Dec. 12, 1933.  R. BYERS  1,938,807
LIDDING TOOL
Filed Aug. 11, 1932
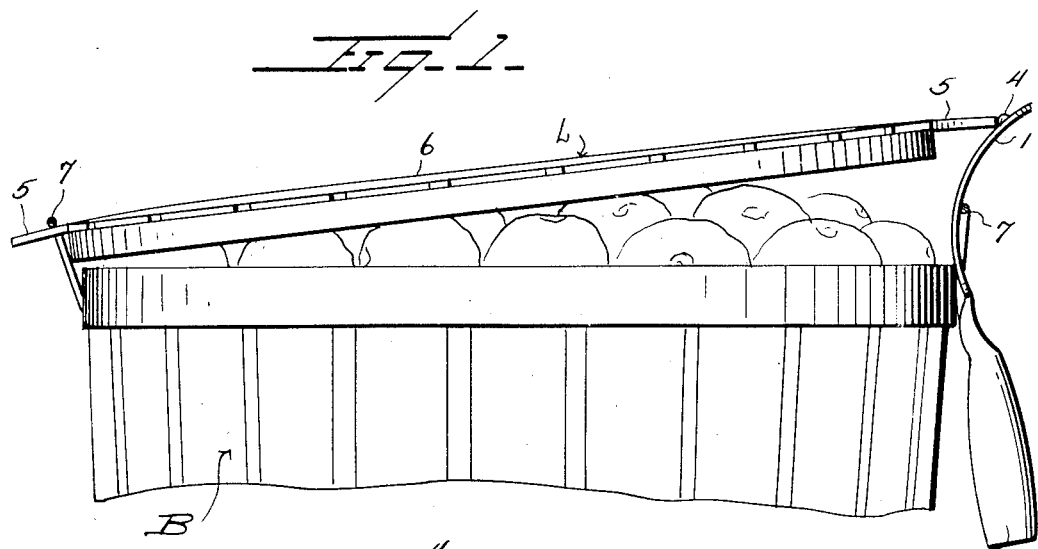
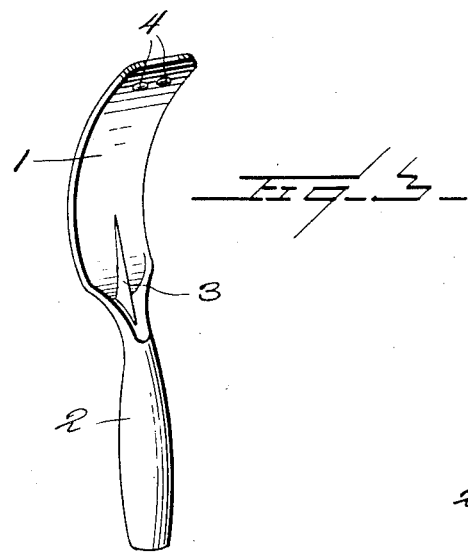
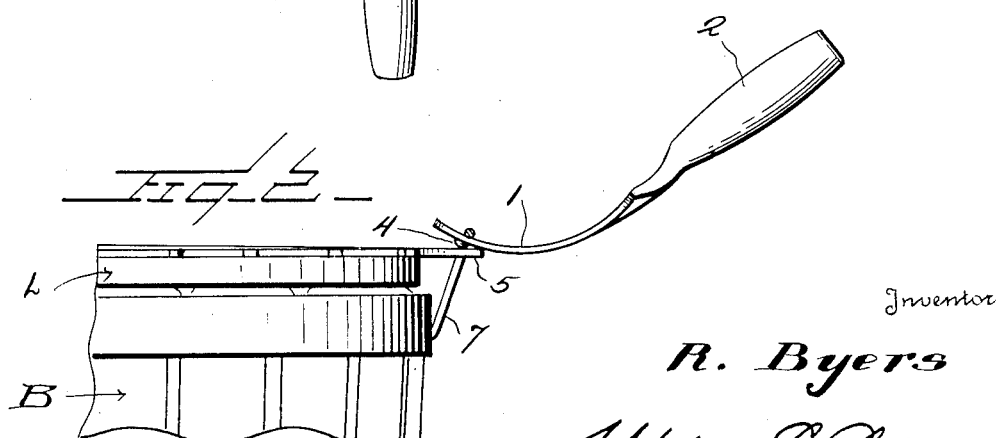
Inventor
R. Byers
By Watson E. Coleman
Attorney Patented Dec. 12, 1933

1,938,807

UNITED STATES PATENT OFFICE 1,938,807

LIDDING TOOL

Robert Byers, Hancock, Md.

Application August 11, 1932. Serial No. 628,425

2 Claims. (Cl. 81—3)

This invention relates to a lidding tool and has relation more particularly to a device of this kind especially designed and adapted for use in connection with the applying of lids upon baskets such as used in connection with fruits and vegetables.

It is an object of the invention to provide a tool of this kind which is intended to be swung about a basket handle as a fulcrum and which is also engageable with a lid in such a way whereby upon rocking movement of the tool the lid is properly placed.

Furthermore, it is an object of the invention to provide a tool of this kind which operates in a manner to assure the proper placement of a lid upon a filled basket and at the same time effect the desired engagement of a basket handle with the lid.

The invention consists in the details of construction and in the combination and arrangement of the several parts of my improved lidding tool whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a fragmentary view in elevation of a basket with a lid partially applied and the handle members for the basket being in section together with a tool constructed in accordance with an embodiment of my invention in initial position;

Figure 2 is a fragmentary elevational view with a basket handle in section showing the position of the tool just after the handle member has been engaged with the lid;

Figure 3 is a view in perspective of the tool as herein disclosed.

As disclosed in the accompanying drawing, my improved tool comprises a blade 1 of desired length and which is preferably of considerable width and which blade is disposed lengthwise on a predetermined curvature. One end portion of the blade 1 is continued by a handle member 2, the end portion of the blade 1 immediately adjacent to the handle member 2 being strengthened or reinforced by a strengthening flange or rib 3 which is disposed along the inbow face of the blade.

The outer end portion of the blade 1 is provided with a pair of transversely spaced and aligned small round protuberances or lugs 4 which extend beyond the outbow face of the blade 1 and which lugs or protuberances 4 in the present embodiment of my invention are pressed out from the blade 1 although it is to be understood that these lugs or protuberances 4 may be otherwise provided.

With the use of a tool constructed in accordance with my invention a basket lid L may be quickly and conveniently applied with but slight effort on the part of the operator due to the leverage action afforded by the tool when in use.

In practice an extended portion 5 of a conventional slat 6 comprised in the construction of the lid L is inserted through one of the conventional loop basket handles 7 which are of wire or other material allowing said handles to give or yield under stress or strain. In applying the lid L in this fashion with the basket B filled as illustrated in Figure 1, the lid L is disposed on an upward incline toward the second basket handle 7 for the basket. In order to complete the application of the lid the blade 1 of my improved tool is inserted through the second basket handle 7 with its outbow face disposed toward the basket. The lugs or protuberances 4 contact with the outer edge of the second or adjacent slat extension 5, as particularly illustrated in Figure 1, so that as initial upward pull is imposed on the handle member 2 of the tool said outer edge of the second extension 5 will provide a fulcrum upon which the tool swings upwardly resulting in the basket handle 7 being forced or carried outwardly a distance to allow the adjacent portion of the lid L to be brought downwardly into proper relation to the basket B. After the basket handle 7 has been forced outwardly a relatively slight distance the lugs 4 will ride over upon the top of the second extension 5 whereupon this second basket handle 7 serves as a fulcrum about which the blade 1 swings.

This action results in the outer end portion of the blade 1 imposing such stress upon the second extension 5 to force the adjacent portion of the lid L in proper position with respect to the basket B. As the blade 1 is swung upwardly the inbow face of the blade will have such engagement with the associated basket handle 7 as the tool continues to swing upwardly upon the second extension 5 to force such basket handle 7 inwardly and over the second extension 5 as particularly illustrated in Figure 2. This upward swinging movement of the tool is continued until the outer portion of the blade 1 swings free of the basket handle 7 whereupon the lidding operation is completed.

From the foregoing description it is thought to be obvious that a lidding tool constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A lidding tool for use with a basket having handles of a looped type, and a lid for the basket having slat extensions, said tool comprising an elongated and longitudinally curved blade insertible through a handle of the basket, the outbow face of the blade adjacent to its outer end having an outstanding minute lug for contact with the outer end of a slat extension of the lid, the handle through which the blade is directed providing a fulcrum about which the blade is adapted to be swung by pull upon the end portion of the blade remote from the lug.

2. A lidding tool for use with a basket having handles of a looped type, and a lid for the basket, said tool comprising an elongated blade insertible through a handle of the basket, a face of the blade adjacent to its outer end having an outstanding lug for contact with the lid, the handle through which the blade is directed providing a fulcrum about which the blade is adapted to be swung by pull upon the end portion of the blade remote from the lug.

ROBERT BYERS.